United States Patent
Zuo

(10) Patent No.: US 9,503,586 B2
(45) Date of Patent: Nov. 22, 2016

(54) ONLINE CHARGING METHOD, APPARATUS, AND SYSTEM BASED ON NUMBER PORTABILITY SERVICE

(71) Applicant: Huawei Technologies Co., Ltd., Shenzhen (CN)

(72) Inventor: Jun Zuo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 346 days.

(21) Appl. No.: 14/032,330

(22) Filed: Sep. 20, 2013

(65) Prior Publication Data

US 2014/0169224 A1  Jun. 19, 2014

(30) Foreign Application Priority Data

Dec. 19, 2012  (CN) .......................... 2012 1 0554623

(51) Int. Cl.
| | | |
|---|---|---|
| H04M 15/00 | (2006.01) | |
| H04W 4/24 | (2009.01) | |
| H04L 29/06 | (2006.01) | |
| H04L 12/14 | (2006.01) | |

(52) U.S. Cl.
CPC ...... *H04M 15/8038* (2013.01); *H04L 12/1403* (2013.01); *H04L 12/1467* (2013.01); *H04L 65/1016* (2013.01); *H04L 65/1063* (2013.01); *H04L 65/1096* (2013.01); *H04M 15/64* (2013.01); *H04M 15/752* (2013.01); *H04W 4/24* (2013.01); *H04L 12/1485* (2013.01)

(58) Field of Classification Search
None
See application file for complete search history.

(56) References Cited

U.S. PATENT DOCUMENTS

| | | | |
|---|---|---|---|
| 2005/0111641 A1 | 5/2005 | Koskinen et al. | |
| 2006/0256748 A1* | 11/2006 | Jung | H04L 65/103 370/328 |
| 2007/0258575 A1* | 11/2007 | Douglas | H04L 29/1216 379/221.13 |
| 2007/0280447 A1* | 12/2007 | Cai | H04M 15/00 379/114.03 |

(Continued)

FOREIGN PATENT DOCUMENTS

| | | |
|---|---|---|
| CN | 1964394 A | 5/2007 |
| CN | 1968310 A | 5/2007 |

(Continued)

OTHER PUBLICATIONS

International Search Report and Written Opinion received in Application No. PCT/CN2013/080689 mailed Nov. 7, 2013, 14 pages.

(Continued)

*Primary Examiner* — Noel Beharry
*Assistant Examiner* — Wilfred Thomas
(74) *Attorney, Agent, or Firm* — Slater Matsil, LLP

(57) ABSTRACT

The present invention relates to the field of communications technologies, and in particular, to an online charging method, apparatus, and system based on a number portability service. When a calling UE in an IMS network initiates a call to a called UE, after receiving an invite message sent by a CSCF entity in the IMS network, an AS in the IMS network queries number portability information corresponding to a number of the called UE and sends a number of the calling UE and the found number portability information to an OCS in the IMS network, so that the OCS is capable of performing charging authentication for the calling UE according to the number portability information and the number of the calling UE. When the called UE has changed a subscription network and subscribed to an NP service, the OCS is thus capable of correctly performing charging authentication.

16 Claims, 6 Drawing Sheets

(56) References Cited

U.S. PATENT DOCUMENTS

| | | | |
|---|---|---|---|
| 2009/0036128 A1* | 2/2009 | Raguparan | H04W 36/0033 455/436 |
| 2009/0245256 A1 | 10/2009 | Yan et al. | |
| 2012/0034900 A1* | 2/2012 | Agarwal | H04L 12/14 455/406 |
| 2013/0315230 A1* | 11/2013 | Li | H04L 12/14 370/352 |

FOREIGN PATENT DOCUMENTS

| | | |
|---|---|---|
| CN | 101026462 A | 8/2007 |
| CN | 101102205 A | 1/2008 |
| CN | 101127611 A | 2/2008 |
| CN | 101232389 A | 7/2008 |
| CN | 101715178 A | 5/2010 |
| CN | 102142968 A | 8/2011 |
| CN | 103052047 A | 4/2013 |
| EP | 1379068 A1 | 1/2004 |
| EP | 1950942 A1 | 7/2008 |
| EP | 2461617 A1 | 6/2012 |
| EP | 2677787 A2 * 12/2013 ............ H04Q 3/005 |
| JP | 2009538569 A | 11/2009 |
| WO | 2007139877 A1 | 12/2007 |
| WO | 2011144027 A2 | 11/2011 |

OTHER PUBLICATIONS

Extended European Search Report received in Application No. 13185541.3-1862 mailed Feb. 11, 2014, 8 pages.

* cited by examiner

When a calling UE in an IMS network initiates a call to a called UE, an AS in the IMS network receives an invite message sent by a CSCF entity in the IMS network, where the invite message carries a number of the calling UE and a number of the called UE — S201

The AS sends a number portability information query request to an NPDB server, where the number portability information query request carries the number of the called UE — S202

The AS receives a number portability information query response sent by the NPDB server, where the number portability information query response carries NP information corresponding to the number of the called UE — S203

The AS sends an initial CCR message to an OCS in the IMS network, where the initial CCR message carries the NP information and the number of the calling UE, so that the OCS performs charging authentication for the calling UE according to the NP information and the number of the calling UE — S204

FIG. 2

ONLINE CHARGING METHOD, APPARATUS, AND SYSTEM BASED ON NUMBER PORTABILITY SERVICE

CROSS-REFERENCE TO RELATED APPLICATION

This application claims priority to Chinese Patent Application No. 201210554623.4, filed on Dec. 19, 2012, which is hereby incorporated by reference in its entirety.

TECHNICAL FIELD

The present invention relates to the field of communications technologies, and in particular, to an online charging method, apparatus, and system based on a number portability service.

BACKGROUND

A number portability (Number Portability, NP for short) service is a service that a user is capable of continuing to use an original number in a currently subscribed network after the user changes a subscription network. By using the NP service, the user is capable of changing the subscription network very conveniently. Currently, for fair competition, the Telecommunications Regulatory Authorities in many countries and regions require all telecom operators to provide the NP service, so as to avoid inconvenience caused due to a change in the number required after the user changes the subscription network.

A network to which the user currently subscribes is also known as a recipient network (Recipient Network), and a network to which the user initially subscribes is known as a donor network (Donor Network). For example, for a UE (User Equipment, user equipment) whose number is xxx, a donor network to which the UE belongs is a communications network deployed by China Mobile; when the user is ported in (port in) a communications network deployed by China Unicom from the communications network deployed by China Mobile, a recipient network to which the UE belongs is the communications network deployed by China Unicom. In this case, all services on the UE are provided by the communications network deployed by China Unicom.

In IMS (Internet Protocol Multimedia Subsystem, Internet Protocol multimedia subsystem) network architecture, when a called UE has changed a subscription network and subscribed to an NP service, in a process in which a calling UE calls the called UE, a calling network side first needs to perform charging authentication for the calling UE, then query a routing number (Routing Number, RN for short) corresponding to a number of the called UE in a number portability database (Number Portability Database, NPDB for short) server after the charging authentication is successful, and route the call to a recipient network to which the called UE belongs according to the routing number obtained through the query. The calling network side refers to a communications network to which the calling UE belongs. When the called UE has changed the subscription network and subscribed to the NP service, the called UE may use a number allocated by a donor network in the recipient network.

Specifically, after receiving a call request sent by the calling UE, an S-CSCF (Serving-Call Session Control Function, serving-call session control function) entity at the calling network side sends an initial CCR (Credit Control Request, credit control request) message to an OCS (Online Charging System, online charging system) at the calling network side through an AS (Application Server, application server) at the calling network side. The initial CCR message carries a number of the calling UE and the number of the called UE. The OCS determines a communications network to which the called UE belongs according to the number of the called UE, determines a charge rate of a call between the communications network to which the calling UE belongs and the communications network to which the called UE belongs, and performs the charging authentication for the calling UE according to the charge rate, so as to determine whether an account of the calling UE has a sufficient balance to support a call with a minimum call duration. After the charging authentication is successful, the OCS sends a GSU (Granted Service Unit, granted service unit) to the AS. The AS instructs the S-CSCF entity to query the routing number corresponding to the number of the called UE in the NPDB server. After finding the routing number corresponding to the number of the called UE, the S-CSCF entity routes the call to the recipient network to which the called UE belongs according to the routing number.

By analyzing the prior art, the inventor thinks that the prior art at least has the following problem:

In a process in which the calling UE initiates a call to the called UE, the OCS determines the communications network to which the called UE belongs according to the number of the called UE. If the communications network to which the calling UE belongs and the communications network to which the called UE belongs are communications networks deployed by a same operator, charging authentication is performed for the calling UE according to a charge rate of an intra-network call. If the communications network to which the calling UE belongs and the communications network to which the called UE belongs are not communications networks deployed by a same operator, charging authentication is performed for the calling UE according to a charge rate of an inter-network call. For the called UE that has changed the subscription network and subscribed to the NP service, although the number of the called UE does not change, the communications network to which the called UE belongs has changed. Therefore, an error is likely to occur when the OCS performs charging authentication for the calling UE.

SUMMARY

To overcome the defect in the prior art, an objective of embodiments of the present invention is to provide an online charging method, apparatus, and system based on a number portability service, so that when a called UE has changed a subscription network and subscribed to an NP service and when a calling UE in an IMS network initiates a call to the called UE, an OCS in the IMS network is capable of correctly performing charging authentication for the calling UE.

In a first aspect, an embodiment of the present invention provides an online charging method based on a number portability service, including:

when a calling UE in an IMS network initiates a call to a called UE, receiving, by an AS in the IMS network, an invite message sent by a call session control function (Call Session Control Function, CSCF for short) entity in the IMS network, where the invite message carries a number of the calling UE and a number of the called UE;

sending, by the AS, a number portability information query request to an NPDB server, where the number portability information query request carries the number of the called UE;

receiving, by the AS, a number portability information query response sent by the NPDB server, where the number portability information query response carries number portability information corresponding to the number of the called UE; and sending, by the AS, an initial credit control request message to an OCS in the IMS network, where the initial credit control request message carries the number portability information and the number of the calling UE, so that the OCS performs charging authentication for the calling UE according to the number portability information and the number of the calling UE.

In a first possible implementation manner of the first aspect, the number portability information includes a routing number; and the performing, by the OCS, charging authentication for the calling UE according to the number portability information and the number of the calling UE includes:

determining, by the OCS, a recipient network to which the called UE belongs according to the routing number, and determining a charge rate of a call between the IMS network and the recipient network; and performing, by the OCS, the charging authentication for the calling UE according to the number of the calling UE and the charge rate.

With reference to the first possible implementation manner of the first aspect, in a second possible implementation manner of the first aspect, the recipient network to which the called UE belongs and the IMS network are not a same communications network.

In a third possible implementation manner of the first aspect, the number portability information includes a port-in identity, where the port-in identity is used to indicate that the called UE has been ported in the IMS network from another communications network; and the performing, by the OCS, charging authentication for the calling UE according to the number portability information and the number of the calling UE includes:

according to the port-in identity and the number of the calling UE, performing, by the OCS, the charging authentication for the calling UE on the basis of a charge rate of an intra-network call in the IMS network.

With reference to the first aspect or any one of the first to third possible implementation manners of the first aspect, in a fourth possible implementation manner of the first aspect, the invite message further carries information about a codec supported by the calling UE; and after the receiving, by the AS, the number portability information query response sent by the NPDB server, the method further includes:

sending, by the AS, a codec negotiation request message to an MRF (Multimedia Resource Function, multimedia resource function) entity in the IMS network, where the codec negotiation request message carries the information about the codec supported by the calling UE, so that the MRF entity determines, according to information about a codec supported by the MRF entity and the information about the codec supported by the calling UE, a codec supported by both the MRF entity and the calling UE;

receiving, by the AS, a codec negotiation response message sent by the MRF entity, where the codec negotiation response message carries information about the codec determined by the MRF entity; and sending, by the AS, the information about the codec determined by the MRF entity to the calling UE, so that the calling UE decodes, according to the received information about the codec, an audio file sent by the MRF entity and plays the decoded audio file, where the audio file sent by the MRF entity includes voice notification information indicating that the called UE has changed a subscription network.

With reference to the first aspect or any one of the first to third possible implementation manners of the first aspect, in a fifth possible implementation manner of the first aspect, after the charging authentication is successful, the method further includes:

receiving, by the AS, an initial credit control answer message sent by the OCS, where the initial credit control answer message carries a granted service unit; and storing, by the AS, correspondence between the granted service unit and the number of the calling UE, and sending the CSCF entity an invite message carrying the number portability information.

In a second aspect, an embodiment of the present invention provides an application server in an IMS network, including:

a receiving unit, configured to: when a calling UE in the IMS network initiates a call to a called UE, receive an invite message sent by a CSCF entity in the IMS network, where the invite message carries a number of the calling UE and a number of the called UE; and a sending unit, configured to send a number portability information query request to an NPDB server, where the number portability information query request carries the number of the called UE received by the receiving unit, where:

the receiving unit is further configured to receive a number portability information query response sent by the NPDB server, where the number portability information query response carries number portability information corresponding to the number of the called UE; and the sending unit is further configured to send an initial credit control request message to an OCS in the IMS network, where the initial credit control request message carries the number portability information received by the receiving unit and the number of the calling UE received by the receiving unit, so that the OCS performs charging authentication for the calling UE according to the number portability information and the number of the calling UE.

In a first possible implementation manner of the second aspect, the number portability information includes a routing number.

In a second possible implementation manner of the second aspect, the number portability information includes a port-in identity, where the port-in identity is used to indicate that the called UE has been ported in the IMS network from another communications network.

With reference to the second aspect or the first or second possible implementation manner of the second aspect, in a third possible implementation manner of the second aspect, the invite message received by the receiving unit further carries information about a codec supported by the calling UE;

the sending unit is further configured to send a codec negotiation request message to an MRF entity in the IMS network after the receiving unit receives the number portability information query response sent by the NPDB server, where the codec negotiation request message carries the information about the codec supported by the calling UE, so that the MRF entity determines, according to information about a codec supported by the MRF entity and the information about the codec supported by the calling UE, a codec supported by both the MRF entity and the calling UE;

the receiving unit is further configured to receive a codec negotiation response message sent by the MRF entity, where the codec negotiation response message carries information about the codec determined by the MRF entity; and the sending unit is further configured to send the information about the codec determined by the MRF entity to the calling UE, where the information about the codec is received by the receiving unit, so that the calling UE decodes, according to the received information about the codec, an audio file sent by the MRF entity and plays the decoded audio file, where the audio file sent by the MRF entity includes voice notification information indicating that the called UE has changed a subscription network.

With reference to the second aspect or the first or second possible implementation manner of the second aspect, in a fourth possible implementation manner of the second aspect, the receiving unit is further configured to receive an initial credit control answer message sent by the OCS, where the initial credit control answer message carries a granted service unit; and the sending unit is further configured to store correspondence between the granted service unit and the number of the calling UE and send the CSCF entity an invite message carrying the number portability information.

In a third aspect, an embodiment of the present invention provides a charging system based on a number portability service, including an AS in an IMS network and an NPDB server in the IMS network, where:

the AS is configured to: when a calling UE in the IMS network initiates a call to a called UE, receive an invite message sent by a CSCF entity in the IMS network, where the invite message carries a number of the calling UE and a number of the called UE, and send a number portability information query request to the NPDB server, where the number portability information query request carries the number of the called UE;

the NPDB server is configured to receive the number portability information query request sent by the AS, query number portability information corresponding to the number of the called UE, and send a number portability information query response to the AS, where the number portability information query response carries the number portability information corresponding to the number of the called UE; and the AS is further configured to receive the number portability information query response sent by the NPDB server, and send an initial credit control request message to an OCS in the IMS network, where the initial credit control request message carries the number portability information and the number of the calling UE, so that the OCS performs charging authentication for the calling UE according to the number portability information and the number of the calling UE.

In a first possible implementation manner of the third aspect, the system further includes:

the OCS, configured to receive the initial credit control request message sent by the AS and perform the charging authentication for the calling UE according to the number portability information and the number of the calling UE that are in the initial credit control request message.

According to the online charging method, apparatus, and system based on an NP service that are provided in the embodiments of the present invention, when a called UE has changed a subscription network and subscribed to an NP service and when a calling UE in an IMS network initiates a call to the called UE, an initial CCR message sent by an AS in the IMS network to an OCS in the IMS network includes NP information of the called UE. Compared with the prior art, the OCS determines a recipient network to which the called UE belongs according to the NP information of the called UE, which avoids a defect that a communications network to which the called UE belongs is determined according to a number of the called UE, so that the OCS is capable of correctly performing charging authentication for the calling UE.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 2 is a flowchart of an online charging method based on an NP service according to an embodiment of the present invention;

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
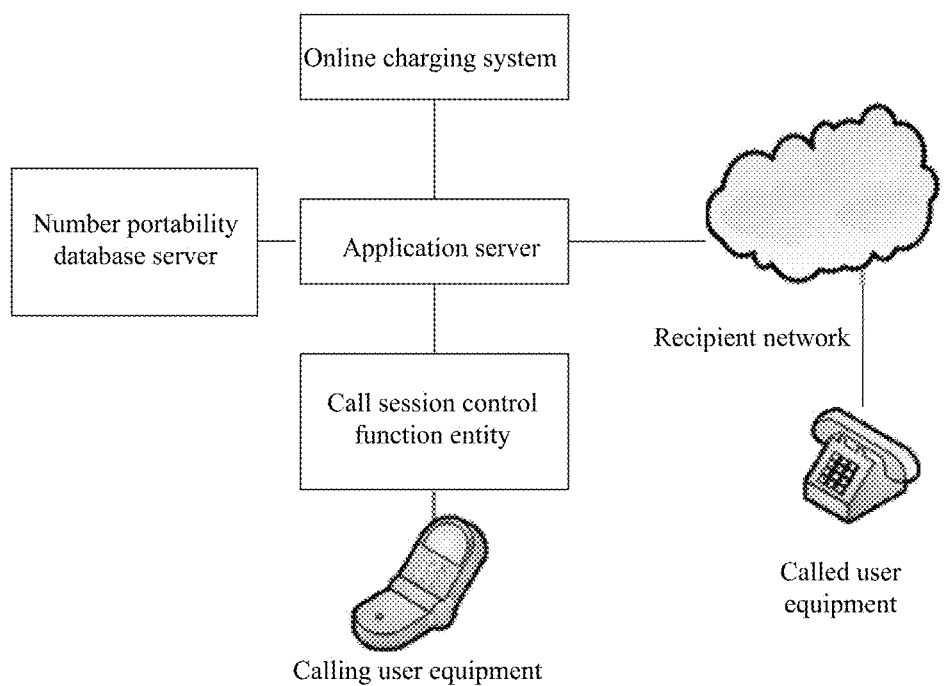
FIG. 1 is an architecture diagram of an online charging system based on an NP service according to an embodiment of the present invention.

FIG. 1 is an architecture diagram of an online charging system based on an NP service according to an embodiment of the present invention. A called UE has changed a subscription network and subscribed to an NP service, and a network to which the called UE currently subscribes is known as a recipient network (Recipient Network). When a calling UE in an IMS network initiates a call to the called UE, after receiving an invite message sent by a CSCF (Call Session Control Function, call session control function) entity in the IMS network, an AS in the IMS network queries NP information corresponding to a number of the called UE in an NPDB server, and the AS sends the found NP information to an OCS, so that the OCS performs charging authentication for the calling UE according to the NP information.

The NPDB server may be a public NPDB server, or may be a private NPDB server in the IMS network, which is not limited in this embodiment of the present invention.

It should be noted that a recipient network to which the called UE belongs and the IMS network may not be a same communications network, or may be a same communications network. When the recipient network to which the called UE belongs and the IMS network are a same communications network, the called UE is ported in (port in) the IMS network from another communications network.

It should be noted that after the called UE has changed the subscription network and subscribed to the NP service, a communications network to which the called UE currently belongs is the recipient network to which the called UE belongs.

For exemplary rather than limitation, the calling UE may include a mobile phone, a fixed-line phone, a tablet computer that supports a call, or various other intelligent terminals, and the called UE may include a mobile phone, a fixed-line phone, a tablet computer that supports a call, or various other intelligent terminals.

Based on the system architecture diagram shown in FIG. 1, an embodiment of the present invention provides an online charging method based on an NP service. As shown in FIG. 2, the method includes:

S201: When a calling UE in an IMS network initiates a call to a called UE, an AS in the IMS network receives an invite message sent by a CSCF entity in the IMS network, where the invite message carries a number of the calling UE and a number of the called UE.

The AS may be a common application server (Common Application Server, Common AS for short), and the common application server may be configured to provide functions, such as rights control and call charging, for a user equipment in the IMS network.

It should be noted that the CSCF entity that sends the invite message may be an S-CSCF entity.

S202: The AS sends a number portability information query request to an NPDB server, where the number portability information query request carries the number of the called UE.

The NPDB server may be a public NPDB server, or may be a private NPDB server in the IMS network, which is not limited in this embodiment of the present invention.

S203: The AS receives a number portability information query response sent by the NPDB server, where the number portability information query response carries NP information corresponding to the number of the called UE.

Correspondence between a number of a user equipment and NP information is stored in the NPDB server, and therefore the NPDB server is capable of obtaining, according to the number of the called UE, the NP information corresponding to the number of the called UE.

It should be noted that the NP information may include a routing number or a port-in identity, where the port-in identity is used to indicate that the called UE has been ported in the IMS network from another communications network. When the NP information includes the routing number, the AS may determine a recipient network to which the called UE belongs according to the routing number. When the NP information includes the port-in identity, the AS may determine that the recipient network to which the called UE belongs is the IMS network.

S204: The AS sends an initial CCR message to an OCS in the IMS network, where the initial CCR message carries the NP information and the number of the calling UE, so that the OCS performs charging authentication for the calling UE according to the NP information and the number of the calling UE.

It should be noted that a CCR message carries a field CC-Request-Type, and the initial CCR message refers to a CCR message whose CC-Request-Type is INITIAL_REQUEST.

The OCS may perform the charging authentication for the calling UE in the following manners:

Manner 1: The NP information includes the routing number, and the OCS determines the recipient network to which the called UE belongs according to the routing number, determines a charge rate of a call between the IMS network and the recipient network, and performs the charging authentication for the calling UE according to the number of the calling UE and the charge rate.

Manner 2: The NP information includes the port-in identity. According to the port-in identity and the number of the calling UE, the OCS performs the charging authentication for the calling UE on the basis of a charge rate of an intra-network call in the IMS network.

It should be noted that after the charging authentication performed by the OCS for the calling UE is successful, the AS may further receive an initial CCA (Credit Control Answer, credit control answer) message sent by the OCS, where the initial CCA message carries a GSU (Granted Service Unit, granted service unit), and the AS stores correspondence between the GSU and the number of the calling UE and sends the CSCF entity an invite message carrying the NP information.

The GSU is a service unit that is granted by the OCS and can be used by the AS in a process of a call between the calling UE and the called UE. Generally, the GSU is in the unit of seconds.

According to the online charging method based on an NP service that is provided in this embodiment of the present invention, when a called UE has changed a subscription network and subscribed to an NP service and when a calling UE in an IMS network initiates a call to the called UE, an initial CCR message sent by an AS in the IMS network to an OCS in the IMS network includes NP information of the called UE. Compared with the prior art, the OCS determines a recipient network to which the called UE belongs according to the NP information of the called UE, which avoids a defect that a communications network to which the called UE belongs is determined according to a number of the called UE, so that the OCS is capable of correctly performing charging authentication for the calling UE.

Figure 3:
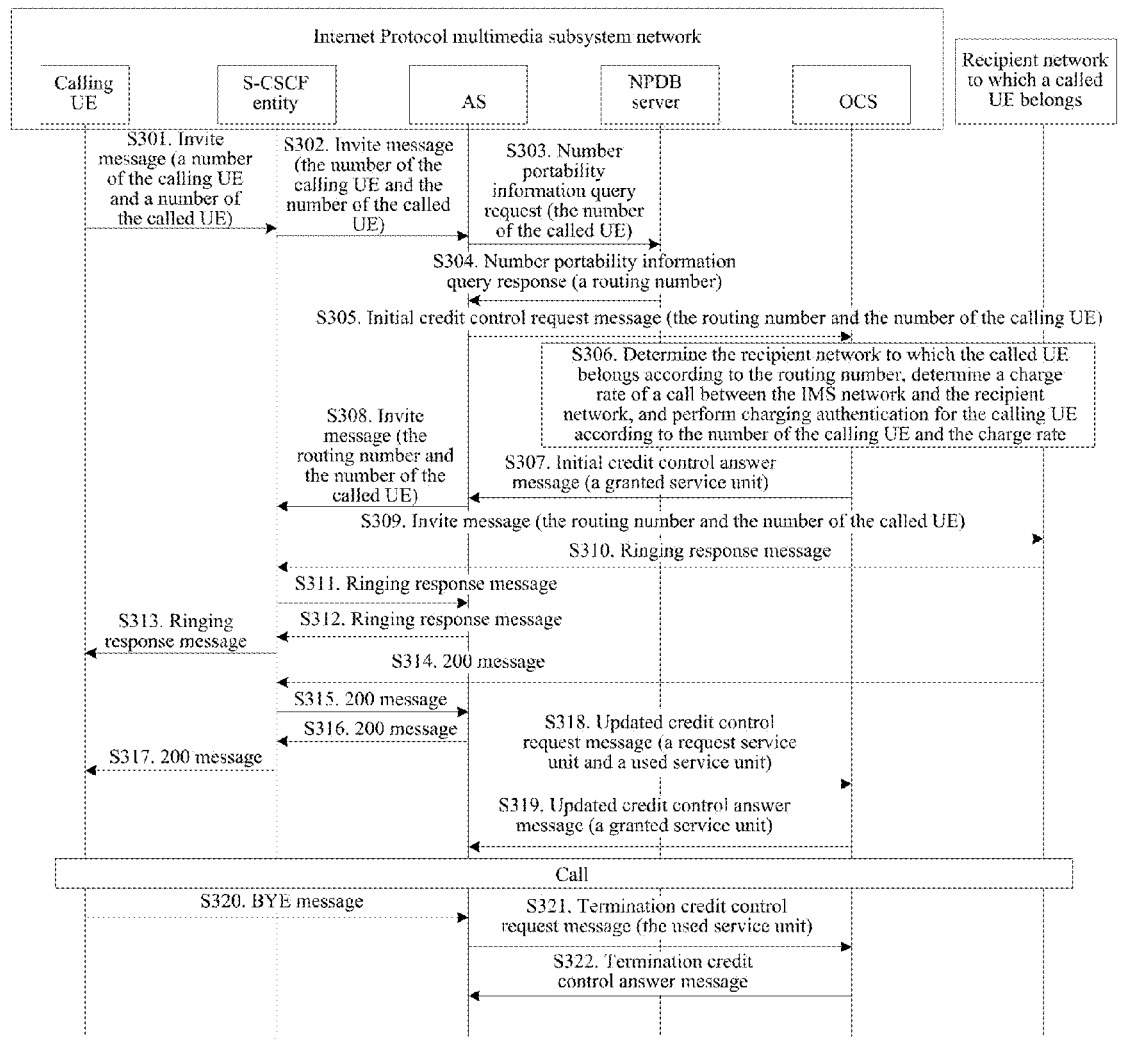
FIG. 3 is a flowchart of another online charging method based on an NP service according to an embodiment of the present invention.

FIG. 3 is a flowchart of an online charging method based on an NP service according to an embodiment of the present invention. The method includes:

S301: A calling UE in an IMS network sends an invite (Invite) message to an S-CSCF entity in the IMS network, where the invite message carries a number of the calling UE and a number of a called UE.

It should be noted that a number of a UE may be used to identify the UE, and the number of the UE may include but is not limited to an IMSI (International Mobile Subscriber Identity, international mobile subscriber identity), an IMEI (International Mobile Equipment Identity, international mobile equipment identity), or an MSISDN (Mobile Station International Integrated Services Digital Network number, mobile station international integrated services digital network number).

It should be noted that the calling UE may send the invite message to the S-CSCF through a P-CSCF (Proxy-Call Session Control Function, proxy-call session control function).

S302: The S-CSCF entity sends the invite message to an AS in the IMS network.

The S-CSCF entity may send the invite message to the AS according to an iFC (initial Filter Criteria, initial filter criteria) of the calling UE.

It should be noted that the AS may be a Common AS.

S303: The AS sends an NP information query request to an NPDB server, where the NP information query request carries the number of the called UE.

The NPDB server may be a public NPDB server, or may be a private NPDB server in the IMS network.

Optionally, the AS may send the NP information query request to the NPDB server through the ENUM (E.164 Number to URI Mapping, E.164 Number to URI Mapping) protocol.

S304: The NPDB server queries, according to the number of the called UE, a routing number corresponding to the number of the called UE and sends an NP information query response to the AS after the routing number corresponding to the number of the called UE is found, where the NP information query response carries the routing number.

Correspondence between a number of a UE and a routing number is stored in the NPDB server, and therefore the NPDB server is capable of finding, according to a number of a UE, a routing number corresponding to the number of the UE.

The routing number may be an address of a switch, and a recipient network to which the called UE belongs may be located by using the routing number.

The invite message sent by the calling UE may further carry information about a codec supported by the calling UE. After receiving the NP information query response sent by the NPDB server, the AS may send a codec negotiation request message to an MRF (Multimedia Resource Function, multimedia resource function) entity in the IMS network, where the codec negotiation request message carries the information about the codec supported by the calling UE. The MRF entity determines, according to information about a codec supported by the MRF entity and the information about the codec supported by the calling UE, a codec supported by both the MRF entity and the calling UE and sends a codec negotiation response message to the AS, where the codec negotiation response message carries information about the codec determined by the MRF entity. The AS sends the information about the codec determined by the MRF entity to the calling UE. The calling UE decodes, according to the received information about the codec, an audio file sent by the MRF entity and plays the decoded audio file, where the audio file sent by the MRF entity includes voice notification information indicating that the called UE has changed a subscription network.

It should be noted that the MRF entity may send the audio file to the calling UE after determining the codec supported by both the MRF entity and the calling UE.

S305: The AS sends an initial CCR message to an OCS in the IMS network, where the initial CCR message carries the routing number and the number of the calling UE.

It should be noted that the routing number may be carried in an AVP (Attribute Value Pair, attribute value pair) of the initial CCR message. Specifically, the routing number may be carried in a Number-Portability-Routing-Information AVP of the initial CCR message.

S306: The OCS determines the recipient network to which the called UE belongs according to the routing number, determines a charge rate of a call between the IMS network and the recipient network, and performs charging authentication for the calling UE according to the number of the calling UE and the charge rate.

For exemplary rather than limitation, a subscription network of the calling UE is a communications network deployed by China Mobile, that is, a communications network to which the calling UE belongs is a communications network deployed by China Mobile. An original subscription network of the called UE is a communications network deployed by China Mobile, and then the subscription network of the called UE is changed to a communications network deployed by China Telecom, that is, the recipient network of the called UE is a communications network deployed by China Telecom. When the calling UE calls the called UE, an OCS in the communications network deployed by China Mobile may learn, according to NP information of the called UE, that the called UE has been ported out (port out) to the communications network deployed by China Telecom. In this case, the OCS performs charging authentication for the calling UE according to a charge rate of an inter-network call. If a balance of a current account of the calling UE is 1 Yuan, a charge rate of an intra-network call is 0.5 Yuan/minute, and a charge rate of an inter-network call is 1.5 Yuan/minute, because the balance of the account is less than a charge required for a call with a minimum call duration (for example, 1 minute), the charging authentication performed by the OCS for the calling UE fails.

It should be noted that in this embodiment of the present invention, the recipient network to which the called UE belongs and the IMS network to which the calling UE belongs may be a same communications network, or may not be a same communications network, which is not limited in this embodiment of the present invention.

That the recipient network to which the called UE belongs and the IMS network to which the calling UE belongs are a same communications network refers to that the recipient network to which the called UE belongs and the IMS network to which the calling UE belongs are communications network deployed by a same operator.

S307: After the charging authentication is successful, the OCS sends an initial CCA message to the AS, where the initial CCA message carries a GSU.

A CCA message carries a field CC-Request-Type, and the initial CCA message refers to a CCA message whose CC-Request-Type is INITIAL_REQUEST.

The initial CCR message received by the OCS may further carry an RSU (Request Service Unit, request service unit). After the charging authentication is successful, the OCS allocates the GSU according to the RSU and the balance of the account of the calling UE. The RSU is a service unit that is requested by the AS from the OCS and can be used in a process of a call between the calling UE and the called UE. Generally, the RSU is in the unit of seconds.

It should be noted that after receiving the initial CCA message, the AS may determine whether the charging authentication is successful according to a Result-Code value in the initial CCA message.

Optionally, the initial CCA message may carry the routing number.

S308: The AS stores correspondence between the GSU and the number of the calling UE and sends an invite message to the S-CSCF entity, where the invite message sent by the AS to the S-CSCF entity carries the routing number and the number of the called UE.

It should be noted that when the AS determines, according to the Result-Code value in the initial CCA message, that the charging authentication for the calling UE fails, the AS rejects a call initiated by the calling UE.

S309: The S-CSCF sends an invite message to the recipient network to which the called UE belongs according to the routing number, where the invite message sent to the recipient network carries the routing number and the number of the called UE.

Specifically, the S-CSCF determines the recipient network to which the called UE belongs according to the routing inumber. When the recipient network is a PSTN (Public Switched Telephone Network, public switched telephone network) network, the S-CSCF sends an MGCF (Media Gateway Control Function, media gateway control function) entity in the PSTN network the invite message carrying the routing number and the number of the called UE. When the recipient network is an IMS network, the S-CSCF sends an I-CSCF (Interrogating-Call Session Control Function, interrogating-call session control function) entity in the IMS network the invite message carrying the routing number and the number of the called UE.

The invite message sent to the recipient network may further carry the number of the calling UE.

S310: After the called UE receives the invite message, the called UE starts ringing and sends a ringing response message to the S-CSCF entity through the recipient network to which the called UE belongs.

The ringing response message may include a 180 message or a 183 message.

S311: The S-CSCF entity sends the ringing response message to the AS.

S312: The AS sends the ringing response message to the S-CSCF.

S313: The S-CSCF sends the ringing response message to the calling UE.

S314: When the called UE starts to communicate with the calling UE, the called UE sends a 200 message to the S-CSCF through the recipient network to which the called UE belongs.

S315: The S-CSCF entity sends the 200 message to the AS.

S316: The AS sends the 200 message to the S-CSCF.

S317: The S-CSCF sends the 200 message to the calling UE.

S318: The AS sends an updated CCR message to the OCS, where the updated CCR message carries the RSU and a USU (Used Service Unit, used service unit).

The updated CCR message refers to a CCR message whose CC-Request-Type is UPDATE_REQUEST.

The USU refers to a service unit that is reported by the AS to the OCS and has been used in the process of the call between the calling UE and the called UE. Generally, the USU is in the unit of seconds.

In this step, a value of the USU is 0 seconds.

It should be noted that the updated CCR message may further carry the routing number and the number of the calling UE.

S319: The OCS allocates the GSU according to the RSU and the USU carried in the updated CCR message and sends the allocated GSU to the AS through an updated CCA message.

Specifically, the OCS may allocate the GSU to the calling UE according to the RSU, the USU, and the balance of the account of the calling UE.

The updated CCA message refers to a CCA message whose CC-Request-Type is UPDATE_REQUEST.

After receiving the updated CCA message, the AS stores correspondence between the GSU in the updated CCA message and the number of the calling UE.

It should be noted that when the GSU allocated by the OCS is used up but the call does not end, the AS needs to resend an updated CCR message to the OCS, so that the OCS reallocates a new GSU to the calling UE.

S320: When the call ends and the calling UE is hung up, the calling UE sends a bye (BYE) message to the AS.

The calling UE may send the bye message to the AS through the S-CSCF entity.

S321: The AS sends a termination CCR message to the OCS, where the termination CCR message carries the USU.

After receiving the termination CCR message, the AS may further send a bye message to the called UE.

It should be noted that the termination CCR message refers to a CCR message whose CC-Request-Type is TERMINATION_REQUEST.

S322: The OCS performs charging processing for the calling UE according to the USU carried in the termination CCR message and sends a termination CCA message to the AS after the processing is completed.

The USU carried in the termination CCR message is a duration of the call between the calling UE and the called UE after the AS receives the last updated CCA message.

It should be noted that the termination CCA message refers to a CCA message whose CC-Request-Type is TERMINATION_REQUEST.

According to the online charging method based on an NP service that is provided in this embodiment of the present invention, when a called UE has changed a subscription network and subscribed to an NP service and when a calling UE in an IMS network initiates a call to the called UE, an initial CCR message sent by an AS in the IMS network to an OCS in the IMS network includes NP information of the called UE. Compared with the prior art, the OCS determines a recipient network to which the called UE belongs according to the NP information of the called UE, which avoids a defect that a communications network to which the called UE belongs is determined according to a number of the called UE, so that the OCS is capable of correctly performing charging authentication for the calling UE. Furthermore, the calling UE decodes, according to information about a codec obtained after performing codec negotiation with an MRF entity, an audio file sent by the MRF entity and plays the decoded audio file, so that a user holding the calling UE is capable of learning in time that the called UE has changed a subscription network.

Figure 4:
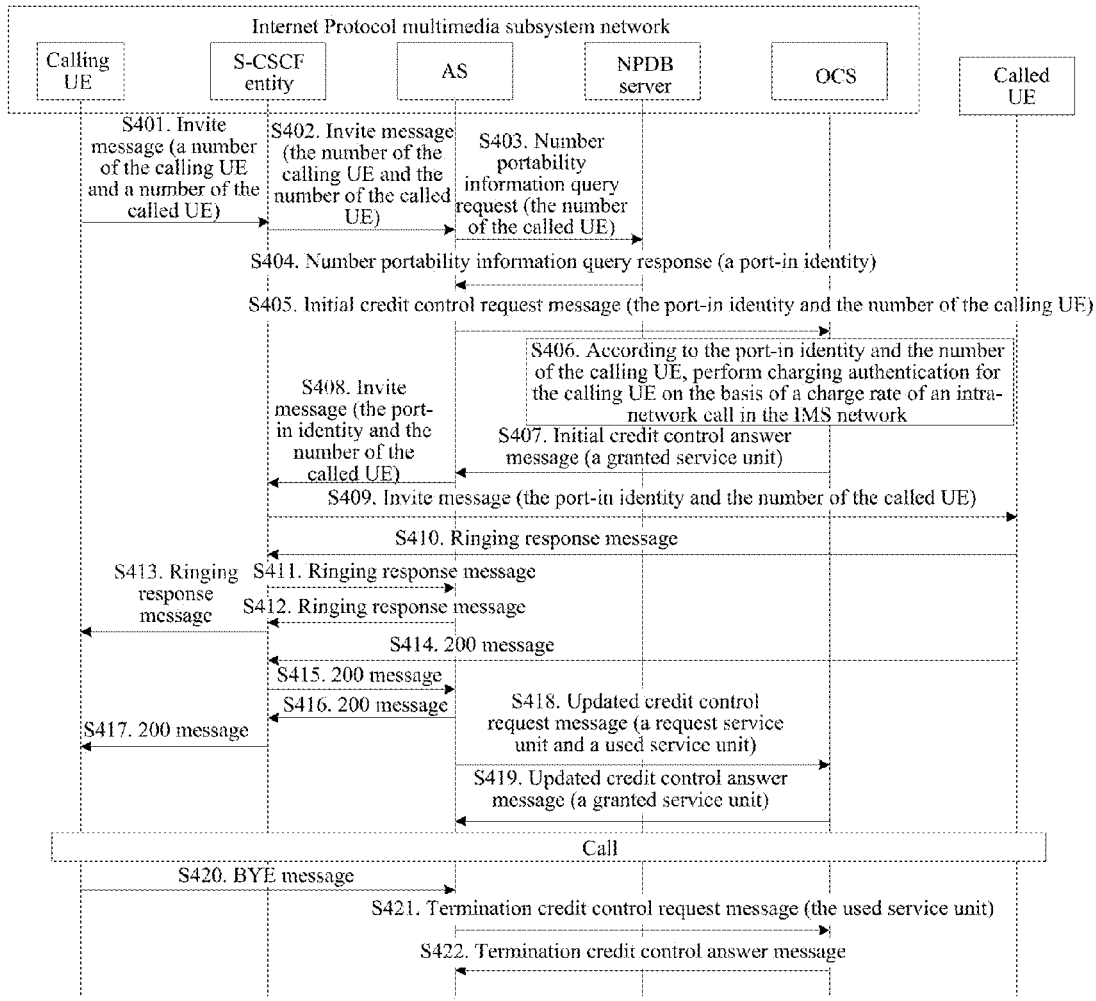
FIG. 4 is a flowchart of still another online charging method based on an NP service according to an embodiment of the present invention.

FIG. 4 is a flowchart of another online charging method based on an NP service according to an embodiment of the present invention, and the method is applied to a scenario in which a called UE is ported in an IMS network when a calling UE in the IMS network calls the called UE. The method includes:

S401: A calling UE in an IMS network sends an invite (Invite) message to an S-CSCF entity in the IMS network, where the invite message carries a number of the calling UE and a number of a called UE.

S402: The S-CSCF entity sends the invite message to an AS in the IMS network.

S403: The AS sends an NP information query request to an NPDB server, where the NP information query request carries the number of the called UE.

For detailed description about step S401 to step S403, reference may be made to step S301 to step S303 respectively. No further details are provided herein.

S404: The NPDB server queries, according to the number of the called UE, a port-in identity corresponding to the number of the called UE and sends an NP information query response to the AS, where the NP information query response carries the port-in identity, and the port-in identity is used to indicate that the called UE has been ported in the IMS network from another communications network.

Correspondence between a number of a UE and a port-in identity is stored in the NPDB server, and therefore the NPDB server is capable of finding, according to a number of a UE, a port-in identity corresponding to the number of the UE.

The invite message sent by the calling UE may further carry information about a codec supported by the calling UE. After receiving the NP information query response sent by the NPDB server, the AS may send a codec negotiation request message to an MRF (Multimedia Resource Function, multimedia resource function) entity in the IMS network, where the codec negotiation request message carries the information about the codec supported by the calling UE. The MRF entity determines, according to information about a codec supported by the MRF entity and the information about the codec supported by the calling UE, a codec supported by both the MRF entity and the calling UE and sends a codec negotiation response message to the AS, where the codec negotiation response message carries information about the codec determined by the MRF entity. The AS sends the information about the codec determined by the MRF entity to the calling UE. The calling UE decodes, according to the received information about the codec, an audio file sent by the MRF entity and plays the decoded audio file, where the audio file sent by the MRF entity includes voice notification information indicating that the called UE has changed a subscription network.

It should be noted that the MRF entity may send the audio file to the calling UE after determining the codec supported by both the MRF entity and the calling UE.

S405: The AS sends an initial CCR message to an OCS in the IMS network, where the initial CCR message carries the port-in identity and the number of the calling UE.

S406: According to the port-in identity and the number of the calling UE, the OCS performs charging authentication for the calling UE on the basis of a charge rate of an intra-network call in the IMS network.

S407: After the charging authentication is successful, the OCS sends an initial CCA message to the AS, where the initial CCA message carries a GSU.

The initial CCR message received by the OCS may further carry an RSU, and the OCS allocates the GSU according to the RSU and a balance of an account of the calling UE after the charging authentication is successful.

Optionally, the initial CCA message may carry the port-in identity.

S408: The AS stores correspondence between the GSU and the number of the calling UE and sends an invite message to the S-CSCF entity, where the invite message sent by the AS to the S-CSCF entity carries the port-in identity and the number of the called UE.

S409: The S-CSCF sends an invite message to the called UE according to the port-in identity, where the invite message sent to the called UE carries the port-in identity and the number of the called UE.

It should be noted that because the called UE has been ported in the IMS network, both the calling UE and the called UE are located in the IMS network, and the S-CSCF entity is capable of sending, in the IMS network, the invite message to the called UE according to the number of the called UE.

S410: After the called UE receives the invite message, the called UE starts ringing and sends a ringing response message to the S-CSCF entity.

S411: The S-CSCF entity sends the ringing response message to the AS.

S412: The AS sends the ringing response message to the S-CSCF.

S413: The S-CSCF sends the ringing response message to the calling UE.

S414: When the called UE starts to communicate with the calling UE, the called UE sends a 200 message to the S-CSCF.

S415: The S-CSCF entity sends the 200 message to the AS.

S416: The AS sends the 200 message to the S-CSCF.

S417: The S-CSCF sends the 200 message to the calling UE.

S418: The AS sends an updated CCR message to the OCS, where the updated CCR message carries the RSU and a USU.

In this step, a value of the USU is 0 seconds.

It should be noted that the updated CCR message may further carry the port-in identity and the number of the calling UE.

S419: The OCS allocates the GSU according to the RSU and the USU carried in the updated CCR message and sends the allocated GSU to the AS through an updated CCA message.

Specifically, the OCS may allocate the GSU to the calling UE according to the RSU, the USU, and the balance of the account of the calling UE.

After receiving the updated CCA message, the AS stores correspondence between the GSU in the updated CCA message and the number of the calling UE.

It should be noted that when the GSU allocated by the OCS is used up but the call does not end, the AS needs to resend an updated CCR message to the OCS, so that the OCS reallocates a new GSU to the calling UE.

S420: When the call ends and the calling UE is hung up, the calling UE sends a bye (BYE) message to the AS.

S421: The AS sends a termination CCR message to the OCS, where the termination CCR message carries the USU.

After receiving the termination CCR message, the AS may further send a bye message to the called UE.

S422: The OCS performs charging processing for the calling UE according to the USU carried in the termination CCR message and sends a termination CCA message to the AS after the processing is completed.

The USU carried in the termination CCR message is a duration of the call between the calling UE and the called UE after the AS receives the last updated CCA message.

According to the online charging method based on an NP service that is provided in this embodiment of the present invention, when a called UE has changed a subscription network and subscribed to an NP service and when a calling UE in an IMS network initiates a call to the called UE, an initial CCR message sent by an AS in the IMS network to an OCS in the IMS network includes NP information of the called UE. Compared with the prior art, the OCS determines a recipient network to which the called UE belongs according to the NP information of the called UE, which avoids a defect that a communications network to which the called UE belongs is determined according to a number of the called UE, so that the OCS is capable of correctly performing charging authentication for the calling UE. Furthermore, the calling UE decodes, according to information about a codec obtained after performing codec negotiation with an MRF entity, an audio file sent by the MRF entity and plays the decoded audio file, so that a user holding the calling UE is capable of learning in time that the called UE has changed a subscription network.

Figure 5:
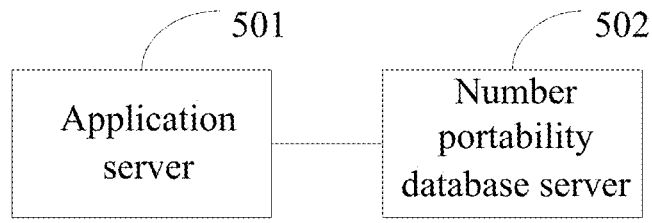
FIG. 5 is a structural diagram of an online charging system based on an NP service according to an embodiment of the present invention.

FIG. 5 is a structural diagram of a charging system based on an NP service according to an embodiment of the present invention. The system includes an AS 501 in an IMS network and an NPDB server 502 in the IMS network.

The AS 501 is configured to: when a calling UE in the IMS network initiates a call to a called UE, receive an invite message sent by a CSCF entity in the IMS network, where the invite message carries a number of the calling UE and a number of the called UE, and send an NP information query request to the NPDB server 502, where the NP information query request carries the number of the called UE.

The NPDB server 502 is configured to receive the NP information query request sent by the AS 501, query NP information corresponding to the number of the called UE, and send an NP information query response to the AS 501, where the NP information query response carries the NP information corresponding to the number of the called UE.

The AS 501 is further configured to receive the NP information query response sent by the NPDB server 502 and send an initial CCR message to an OCS in the IMS network, where the initial CCR message carries the NP information and the number of the calling UE, so that the OCS performs charging authentication for the calling UE according to the NP information and the number of the calling UE.

The system may further include the OCS, where the OCS is configured to receive the initial CCR message sent by the AS 501 and perform the charging authentication for the calling UE according to the NP information and the number of the calling UE that are in the initial CCR message.

According to the charging system based on an NP service that is provided in this embodiment of the present invention, when a called UE has changed a subscription network and subscribed to an NP service and when a calling UE in an IMS network initiates a call to the called UE, an initial CCR message sent by an AS in the IMS network to an OCS in the IMS network includes NP information of the called UE. Compared with the prior art, the OCS determines a recipient network to which the called UE belongs according to the NP information of the called UE, which avoids a defect that a communications network to which the called UE belongs is determined according to a number of the called UE, so that the OCS is capable of correctly performing charging authentication for the calling UE.

Figure 6:
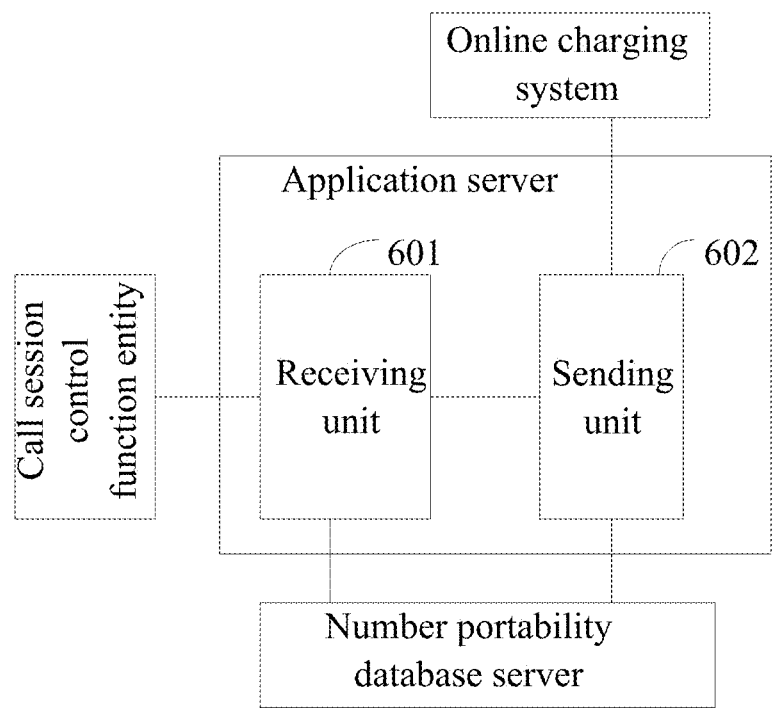
FIG. 6 is a structural diagram of an application server in an IMS network according to an embodiment of the present invention.

FIG. 6 is a structural diagram of an AS in an IMS network according to an embodiment of the present invention, and the AS may be applied to the system shown in FIG. 5. The AS includes:

a receiving unit 601, configured to: when a calling UE in the IMS network initiates a call to a called UE, receive an invite message sent by a CSCF entity in the IMS network, where the invite message carries a number of the calling UE and a number of the called UE; and a sending unit 602, configured to send an NP information query request to an NPDB server, where the NP information query request carries the number of the called UE received by the receiving unit 601, where the receiving unit 601 is further configured to receive an NP information query response sent by the NPDB server, where the NP information query response carries NP information corresponding to the number of the called UE; and the sending unit 602 is further configured to send an initial CCR message to an OCS in the IMS network, where the initial CCR message carries the NP information received by the receiving unit 601 and the number of the calling UE received by the receiving unit 601, so that the OCS performs charging authentication for the calling UE according to the NP information and the number of the calling UE.

It should be noted that in an implementation manner, the NP information may include a routing number; and in another implementation manner, the NP information may include a port-in identity, where the port-in identity is used to indicate that the called UE has been ported in the IMS network from another communications network.

The invite message received by the receiving unit 601 may further carry information about a codec supported by the calling UE.

The sending unit 602 may further be configured to send a codec negotiation request message to an MRF entity in the IMS network after the receiving unit 601 receives the NP information query response sent by the NPDB server, where the codec negotiation request message carries the information about the codec supported by the calling UE, so that the MRF entity determines, according to information about a codec supported by the MRF entity and the information about the codec supported by the calling UE, a codec supported by both the MRF entity and the calling UE.

The receiving unit 601 may further be configured to receive a codec negotiation response message sent by the MRF entity, where the codec negotiation response message carries information about the codec determined by the MRF entity.

The sending unit 602 may further be configured to send the information about the codec determined by the MRF entity to the calling UE, where the information about the codec is received by the receiving unit 601, so that the calling UE decodes, according to the received information about the codec, an audio file sent by the MRF entity and plays the decoded audio file, where the audio file sent by the MRF entity includes voice notification information indicating that the called UE has changed a subscription network.

It should be noted that the receiving unit 601 may further be configured to receive an initial CCA message sent by the OCS, where the initial CCA message carries a granted service unit.

The sending unit 602 is further configured to store correspondence between the granted service unit and the number of the calling UE and send the CSCF entity an invite message carrying the NP information.

Figure 7:
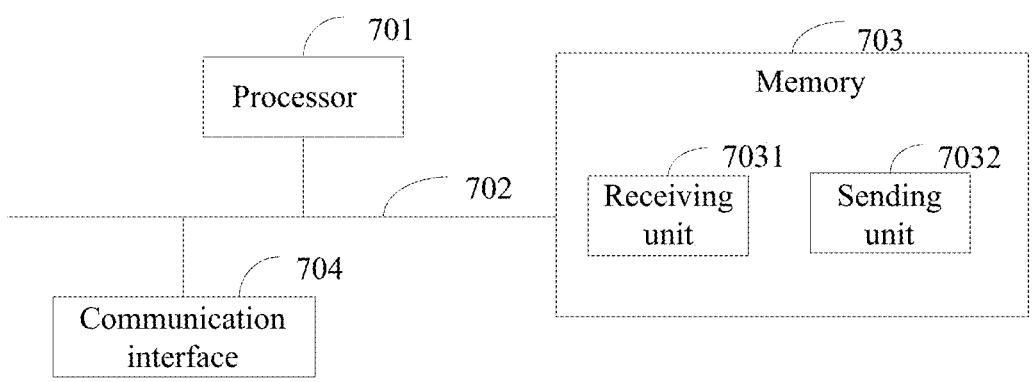
FIG. 7 is a structural diagram of another application server in an IMS network according to an embodiment of the present invention.

FIG. 7 is a structural diagram of an AS in an IMS network according to an embodiment of the present invention, and the AS may be applied to the system shown in FIG. 5. The AS includes at least one processor 701, a communication bus 702, a memory 703, and at least one communication interface 704.

The communication bus 702 is configured to implement connection and communication between the foregoing components, and the communication interface 704 is configured to connect to and communicate with an external device.

The memory 703 is configured to store program codes that need to be executed, where the program codes may specifically include a receiving unit 7031 and a sending unit 7032; the processor 701 is configured to execute the foregoing units stored in the memory 703; and when the foregoing units are executed by the processor 701, the following functions are achieved:

The receiving unit 7031 is configured to: when a calling UE in the IMS network initiates a call to a called UE, receive an invite message sent by a CSCF entity in the IMS network, where the invite message carries a number of the calling UE and a number of the called UE.

The sending unit 7032 is configured to send an NP information query request to an NPDB server, where the NP information query request carries the number of the called UE received by the receiving unit 7031.

The receiving unit 7031 is further configured to receive an NP information query response sent by the NPDB server, where the NP information query response carries NP information corresponding to the number of the called UE.

The sending unit 7032 is further configured to send an initial CCR message to an OCS in the IMS network, where the initial CCR message carries the NP information received by the receiving unit 7031 and the number of the calling UE received by the receiving unit 7031, so that the OCS performs charging authentication for the calling UE according to the NP information and the number of the calling UE.

It should be noted that in an implementation manner, the NP information may include a routing number; and in another implementation manner, the NP information may include a port-in identity, where the port-in identity is used to indicate that the called UE has been ported in the IMS network from another communications network.

The invite message received by the receiving unit 7031 may further carry information about a codec supported by the calling UE.

The sending unit 7032 may further be configured to send a codec negotiation request message to an MRF entity in the IMS network after the receiving unit 7031 receives the NP information query response sent by the NPDB server, where the codec negotiation request message carries the information about the codec supported by the calling UE, so that the MRF entity determines, according to information about a codec supported by the MRF entity and the information about the codec supported by the calling UE, a codec supported by both the MRF entity and the calling UE.

The receiving unit 7031 may further be configured to receive a codec negotiation response message sent by the MRF entity, where the codec negotiation response message carries information about the codec determined by the MRF entity.

The sending unit 7032 may further be configured to send the information about the codec determined by the MRF entity to the calling UE, where the information about the codec is received by the receiving unit 7031, so that the calling UE decodes, according to the received information about the codec, an audio file sent by the MRF entity and plays the decoded audio file, where the audio file sent by the MRF entity includes voice notification information indicating that the called UE has changed a subscription network.

It should be noted that the receiving unit 7031 may further be configured to receive an initial CCA message sent by the OCS, where the initial CCA message carries a granted service unit.

The sending unit 7032 is further configured to store correspondence between the granted service unit and the number of the calling UE and send the CSCF entity an invite message carrying the NP information.

According to the online charging method, apparatus, and system based on an NP service that are provided in the embodiments of the present invention, when a called UE has changed a subscription network and subscribed to an NP service and when a calling UE in an IMS network initiates a call to the called UE, an initial CCR message sent by an AS in the IMS network to an OCS in the IMS network includes NP information of the called UE. Compared with the prior art, the OCS determines a recipient network to which the called UE belongs according to the NP information of the called UE, which avoids a defect that a communications network to which the called UE belongs is determined according to a number of the called UE, so that the OCS is capable of correctly performing charging authentication for the calling UE. Furthermore, the calling UE decodes, according to information about a codec obtained after performing codec negotiation with an MRF entity, an audio file sent by the MRF entity and plays the decoded audio file, so that a user holding the calling UE is capable of learning in time that the called UE has changed a subscription network.

Through the description in the foregoing embodiments, a person skilled in the art may be clearly aware that the present invention may be implemented through hardware, or software, or a combination of hardware and software. When the present invention is implemented through software, the foregoing functions may be stored in a computer readable medium, or transmitted as one or more commands or codes on the computer readable medium. The computer readable medium includes a computer storage medium and a communications medium. The communications medium includes any medium that facilitates transmission of a computer program from one place to another place. The storage medium may be any usable medium accessible to a computer. The following is taken as an example but is not limited: The computer readable medium may include an RAM, an ROM, an EEPROM, a CD-ROM or other optical disk storage, a disk storage medium or other disk storage, or any other medium that can be used to carry or store an expected program code in a command or data structure form and can be accessed by a computer. In addition, any connection may appropriately become a computer readable medium. For example, if the software implements the transmission from a website, a server, or other remote sources by using a coaxial cable, an optical cable, a twisted pair, a digital subscriber line (DSL), or a wireless technology such as infrared, radio, or microwave, the coaxial cable, the optical cable, the twisted pair, the DSL, or the wireless technology such as infrared, radio, or microwave is included in fixation of a home medium. For example, a disk (Disk) and a disc (disc) used in the present invention include a compressed compact disc (CD), a laser disc, an optical disc, a digital versatile disc (DVD), a floppy disk, and a blue-ray disc. Usually a disk magnetically duplicates data, while a disc optically duplicates data by using laser. A combination of the foregoing should also be included in the protection scope of a computer readable medium.

It should be noted that each embodiment in the specification is described in a progressive manner. The same or similar parts in the embodiments are just references to each other. Every embodiment illustrates in emphasis what is different from the other embodiments. In particular, for the apparatus embodiment, since it is basically similar to the method embodiment, the apparatus embodiment is described simply, and the performing of specific functions for all units may be obtained with reference to the part of the description of the method embodiment. The described apparatus embodiments are merely exemplary, where, the units described as separate parts may or may not be physically separate, and parts displayed as units may or may not be physical units, may be located in one position, or may be distributed on a plurality of network elements. A part or all of the modules may be selected according to actual needs to achieve the objectives of the solutions of the embodiments. A person of ordinary skill in the art may understand and implement the embodiments without creative efforts.

In conclusion, the foregoing descriptions are merely exemplary embodiments of the present invention, but are not intended to limit the scope of the present invention. Any modifications, equivalent replacements, or improvements made within the spirit and principle of the present invention shall fall within the protection scope of the present invention.

What is claimed is:

1. An online charging method based on a number portability service, the method comprising:
when a calling user equipment (UE) in an Internet Protocol multimedia subsystem (IMS) network initiates a call to a called UE, receiving, by an application server (AS) in the IMS network, an invite message sent by a call session control function (CSCF) entity in the IMS network, wherein the invite message carries a number of the calling UE and a number of the called UE;
sending, by the AS, a number portability information query request to a number portability database (NPDB) server in the IMS network, wherein the number portability information query request carries the number of the called UE;
receiving, by the AS, a number portability information query response sent by the NPDB server, wherein the number portability information query response carries number portability information corresponding to the number of the called UE; and
sending, by the AS, an initial credit control request message to an online charging system (OCS) in the IMS network, wherein the initial credit control request message carries the number portability information and the number of the calling UE, so that the OCS can perform charging authentication for the calling UE according to the number portability information and the number of the calling UE;
wherein the invite message further carries information about a codec supported by the calling UE and wherein, after the AS receives the number portability information query response sent by the NPDB server, the method further comprises:
sending, by the AS, a codec negotiation request message to a multimedia resource function (MRF) entity in the IMS network, wherein the codec negotiation request message carries the information about the codec supported by the calling UE, so that the MRF entity determines, according to information about a codec supported by the MRF entity and the information about the codec supported by the calling UE, a codec supported by both the MRF entity and the calling UE;
receiving, by the AS, a codec negotiation response message sent by the MRF entity, wherein the codec negotiation response message carries information about the codec determined by the MRF entity; and
sending, by the AS, the information about the codec determined by the MRF entity to the calling UE, so that the calling UE decodes an audio file sent by the MRF entity according to the received information about the codec and plays the decoded audio file, wherein the audio file sent by the MRF entity comprises voice notification information indicating that the called UE has changed a subscription network.

2. The method according to claim 1, wherein the number portability information comprises a routing number and wherein the OCS performs the charging authentication.

3. The method according to claim 2, wherein the OCS performs the charging authentication by:
determining a recipient network to which the called UE belongs according to the routing number;
determining a charge rate of a call between the IMS network and the recipient network; and
performing the charging authentication for the calling UE according to the number of the calling UE and the charge rate.

4. The method according to claim 3, wherein the recipient network to which the called UE belongs and the IMS network are not the same communications network.

5. The method according to claim 3, wherein the recipient network to which the called UE belongs and the IMS network is the same communications network.

6. The method according to claim 2, wherein the number portability information comprises a port-in identity, the port-in identity being used to indicate that the called UE has been ported in the IMS network from another communications network and wherein the OCS performs the charging authentication by performing the charging authentication for the calling UE on the basis of a charge rate of an intra-network call in the IMS network according to the port-in identity and the number of the calling UE.

7. The method according to claim 1, wherein, after the charging authentication is successful, the method further comprises:
receiving, by the AS, an initial credit control answer message sent by the OCS, wherein the initial credit control answer message carries a granted service unit; and
storing, by the AS, correspondence between the granted service unit and the number of the calling UE.

8. The method according to claim 7, further comprising sending the CSCF entity an invite message carrying the number portability information.

9. An application server in an Internet Protocol multimedia subsystem (IMS) network, the application server comprising:
a receiver, configured to, when a calling user equipment (UE) in the IMS network initiates a call to a called UE, receive an invite message sent by a call session control function (CSCF) entity in the IMS network, wherein the invite message carries a number of the calling UE and a number of the called UE; and
a transmitter, configured to send a number portability information query request to a number portability database (NPDB) server in the IMS network, wherein the number portability information query request carries the number of the called UE received by the receiver;
wherein the receiver is further configured to receive a number portability information query response sent by the NPDB server, wherein the number portability information query response carries number portability information corresponding to the number of the called UE; and
wherein the transmitter is further configured to send an initial credit control request message to an online charging system (OCS) in the IMS network, wherein the initial credit control request message carries the number portability information received by the receiver and the number of the calling UE received by the receiver, so that the OCS performs charging authentication for the calling UE according to the number portability information and the number of the calling UE;

wherein the invite message received by the receiver further carries information about a codec supported by the calling UE;

wherein the transmitter is further configured to send a codec negotiation request message to a multimedia resource function (MRF) entity in the IMS network after the receiver receives the number portability information query response sent by the NPDB server, wherein the codec negotiation request message carries the information about the codec supported by the calling UE, so that the MRF entity determines, according to information about a codec supported by the MRF entity and the information about the codec supported by the calling UE, a codec supported by both the MRF entity and the calling UE;

wherein the receiver is further configured to receive a codec negotiation response message sent by the MRF entity, wherein the codec negotiation response message carries information about the codec determined by the MRF entity; and wherein the transmitter is further configured to send the information about the codec determined by the MRF entity to the calling UE, so that the calling UE decodes, according to the received information about the codec, an audio file sent by the MRF entity and plays the decoded audio file, wherein the audio file sent by the MRF entity comprises voice notification information indicating that the called UE has changed a subscription network.

10. The application server according to claim 9, wherein the number portability information comprises a routing number.

11. The application server according to claim 9, wherein the number portability information comprises a port-in identity that is used to indicate that the called UE has been ported in the IMS network from another communications network.

12. The application server according to claim 9, wherein the receiver is further configured to receive an initial credit control answer message sent by the OCS, wherein the initial credit control answer message carries a granted service unit; and wherein the transmitter is further configured to store correspondence between the granted service unit and the number of the calling UE and send the CSCF entity an invite message carrying the number portability information.

13. A charging system based on a number portability service, the charging system comprising:

an application server (AS) in an Internet Protocol multimedia subsystem (IMS) network; and a number portability database (NPDB) server in the IMS network;

wherein the AS is configured to, when a calling user equipment (UE) in the IMS network initiates a call to a called UE, receive an invite message sent by a call session control function (CSCF) entity in the IMS network, wherein the invite message carries a number of the calling UE and a number of the called UE, and to send a number portability information query request to the NPDB server, wherein the number portability information query request carries the number of the called UE;

wherein the NPDB server is configured to receive the number portability information query request sent by the AS, query number portability information corresponding to the number of the called UE, and to send a number portability information query response to the AS, wherein the number portability information query response carries the number portability information corresponding to the number of the called UE; and wherein the AS is further configured to receive the number portability information query response sent by the NPDB server, and to send an initial credit control request message to an online charging system (OCS) in the IMS network, wherein the initial credit control request message carries the number portability information and the number of the calling UE, so that the OCS performs charging authentication for the calling UE according to the number portability information and the number of the calling UE;

wherein the invite message received by the AS further carries information about a codec supported by the calling UE;

wherein the AS is further configured to send a codec negotiation request message to a multimedia resource function (MRF) entity in the IMS network after the AS receives the number portability information query response sent by the NPDB server, wherein the codec negotiation request message carries the information about the codec supported by the calling UE, so that the MRF entity determines, according to information about a codec supported by the MRF entity and the information about the codec supported by the calling UE, a codec supported by both the MRF entity and the calling UE;

wherein the AS is further configured to receive a codec negotiation response message sent by the MRF entity, wherein the codec negotiation response message carries information about the codec determined by the MRF entity; and wherein the AS is further configured to send the information about the codec determined by the MRF entity to the calling UE, so that the calling UE decodes, according to the received information about the codec, an audio file sent by the MRF entity and plays the decoded audio file, wherein the audio file sent by the MRF entity comprises voice notification information indicating that the called UE has changed a subscription network.

14. The system according to claim 13, wherein the system further comprises the OCS.

15. The system according to claim 14, wherein the OCS is configured to receive the initial credit control request message sent by the AS and to perform the charging authentication for the calling UE according to the number portability information and the number of the calling UE that are in the initial credit control request message.

16. The system according to claim 13, wherein the number portability information comprises a routing number or a port-in identity, wherein the port-in identity is used to indicate that the called UE has been ported in the IMS network from another communications network.

* * * * *